United States Patent [19]
Bonin et al.

[11] 3,892,715
[45] July 1, 1975

[54] POLYURETHANES WITH A NEW CATALYST SYSTEM

[75] Inventors: Yves Bonin; Jean Robin, both of Lyon, France

[73] Assignee: Rhone-Poulenc, S.A., Paris, France

[22] Filed: Aug. 3, 1973

[21] Appl. No.: 385,344

[30] Foreign Application Priority Data
Aug. 7, 1972 France .............................. 72.28433

[52] U.S. Cl. ..................... 260/77.5 AB; 260/2.5 AB
[51] Int. Cl. ...................... C08g 22/34; C08g 22/40
[58] Field of Search ... 260/2.5 AB, 77.5 AB, 75 NB

[56] References Cited
UNITED STATES PATENTS

| | | | |
|---|---|---|---|
| 2,933,462 | 4/1960 | Fischer | 260/2.5 AB |
| 3,231,597 | 1/1966 | Fischer | 260/77.5 AB |
| 3,291,660 | 12/1966 | Oberth | 260/77.5 AB |
| 3,314,834 | 4/1967 | Walden | 260/77.5 A |
| 3,527,782 | 9/1970 | Chadwick | 260/453 SP |
| 3,730,919 | 5/1973 | McGinn | 260/2.5 AZ |

FOREIGN PATENTS OR APPLICATIONS

| | | | |
|---|---|---|---|
| 627,424 | 9/1961 | Canada | 260/77.5 AB |
| 575,210 | 5/1959 | Canada | 260/2.5 AB |
| 876,434 | 11/1958 | United Kingdom | 260/2.5 AB |

OTHER PUBLICATIONS

Journal of Applied Polymer Science; Vol. IV, No. 11, pgs. 207–211, (1960).

*Primary Examiner*—Donald E. Czaja
*Assistant Examiner*—C. Warren Ivy
*Attorney, Agent, or Firm*—Cushman, Darby & Cushman

[57] ABSTRACT

A new catalyst system for the production of polyurethanes is provided which involves reacting a polyol and a polyisocyanate such that when the polyisocyanate and the polyol are brought into contact, a catalytic amount of a ferric halide and a catalytic amount of acetylacetone are introduced simultaneously but separately from one another. This catalyst system provides a long initiation period to enable the reactants to be homogenised effectively but a short overall curing time to facilitate mass-production methods.

5 Claims, No Drawings

POLYURETHANES WITH A NEW CATALYST SYSTEM

The present invention relates to a process for the preparation of polyurethanes by means of a new catalyst system, employed in such a way that the rate of urethanisation is slow initially and then becomes rapid thereafter until the reaction is complete.

It is known that the rate of the urethanisation reaction between a compound containing hydroxyl groups and an isocyanate depends upon the nature of the catalyst as well as on its concentration. It is usual to distinguish between catalysts having low catalytic activity such as acid compounds, catalysts having medium catalytic activity such as tertiary amines and catalysts having high activity such as metal compounds, for example those of tin, titanium and iron, these metal compounds optionally being combined with tertiary amines.

The metal compounds, the activity of which, for one and the same metal, undoubtedly depends on the nature of the metal compound, make it possible to increase the rate of production of objects made of polyurethanes and to produce the latter using automatic machines. However, they possess disadvantages due to the very fact of their great reactivity. In effect, it is sometimes difficult to produce polyurethane objects which are satisfactorily uniform by means of such catalysts since, during the mixing of the polyisocyanate and the polyol, the reaction mixture becomes very viscous too rapidly and it is then practically impossible to produce a homogeneous mixture of the reagents.

It is known (see for example, French Pat. No. 1,596,668) to control the reactivity of a glycol, an isocyanate or a mixture thereof by adding a metal salt (to catalyse the reaction) or a complexing agent (to decrease the catalytic effect of the metallic impurities). The criterion used in this document is simply the measurement of the period of time necessary for the reaction mixture to develop a certain viscosity. It does not take into account the two opposing requirements which make it possible to produce homogeneous products rapidly; this requires a more extensive investigation of the reaction kinetics.

It is desirable that the reaction should start very slowly in order to enable the reagents to be mixed as homogeneously as possible, and it is also desirable that, thereafter, the reaction should be very rapid in order to make a high rate of production possible.

A process for the preparation of polyurethane materials has now been found, according to the present invention, according to which the urethanisation reaction is begun in the presence of rather inactive catalyst compounds, and this reaction is then continued and completed in the presence of very active catalysts which are produced at the start of the reaction from compounds introduced at the same time as the reagents. Such a method of working makes it possible to produce homogeneous reaction mixtures, and, consequently, polyurethane materials with very uniform properties, whilst retaining a high overall reaction rate, this rate being comparable with that obtained when the catalysis is carried out using very active urethanisation catalysts.

According to the present invention there is provided a process for the preparation of a polyurethane material which comprises reacting a polyol and a polyisocyanate such that, when the polyisocyanate and the polyol are brought into contact, a small amount of a ferric halide and a small amount of acetylacetone are introduced simultaneously but separately from one another. A particularly valuable method consists of introducing the ferric halide into the polyisocyanate and the acetylacetone into the polyol beforehand.

Of the ferric halides, ferric chloride is preferably used and is conveniently introduced in the form of a concentrated solution in a volatile solvent such as acetone. The amount of ferric halide to be added is preferably such that it corresponds to an amount of iron ranging from 0.001 to 1%, especially from 0.005 to 0.1%, by weight based on the weight of the polyisocyanate employed.

The number of mols of acetylacetone must generally be at least equal to the number of iron atoms introduced into the polyisocyanate and should be an amount from 0.005 to 5% by weight based on the weight of the polyisocyanate. Preferably, the number of acetylacetone molecules is substantially equal to that which corresponds to complete complexing of the iron in the form of ferric acetylacetonate.

The reactants necessary for producing polyurethanes can be chosen, depending on the envisaged application, from any polyisocyanates and polyols usually employed in the preparation of polyurethanes. Generally, any simple aromatic, aliphatic or cycloaliphatic polyisocyanate possessing 2 or more functional groups can be used. Suitable examples include hexamethylene-diisocyanate, butylene-diisocyanate, toluylene-2,4- or 2,6-diisocyanate, p-phenylene-diisocyanate, cyclohexylene-1,4-diisocyanate, 4,4'-diisocyanato-dicyclohexylmethane, 4,4'-diisocyanato-diphenylmethane, 4,4'diisocyanato-diphenyl-ether and polyarylene polyisocyanates with more than two functional groups, obtained from aniline/formaldehyde condensation products. It is also possible to employ modified polyisocyanates produced by reacting an excess of a diisocyanate with a polyol of low molecular weight such as glycerine or trimethylolpropane. It is also possible to use a polyurethane prepolymer possessing terminal isocyanate groups, prepared beforehand by reacting an excess of polyisocyanate with a polyol. Furthermore, in certain cases, it is possible to add small amounts of a monoisocyanate.

As polyols, it is possible to use linear or branched polyols containing 2 or more functional groups. The choice of polyol obviously depends on the envisaged application. Thus, in order to produce elastomer products or flexible foams, long-chain linear polyols or polyols which are only branched to a slight extent, that is to say polyols which have relatively long chains between the hydroxyl groups which are not very numerous, are used. When it is desired to produce hard moulded products or rigid foams, highly branched polyols of relatively low molecular weight should be used. Intermediate between these, semi-rigid or semi-flexible foams can be obtained by controlling the molecular weight and/or the degree of branching of the polyol. It is also possible to modify the properties of the polyols by adding a small amount of a monofunctional hydroxylic compound.

Suitable polyols include polyhydroxylic polyethers such as simple polyalkylene glycols like diethylene glycol and dipropylene glycol and polyethylene glycols and polypropylene glycols and their copolymers. It is also possible to use polyhydroxylic polyethers produced by adding alkylene ethers to simple polyfunctional compounds containing hydroxyl, amine and carboxylic acid groups, such as ethylene glycol, propylene glycol, glycerine, trimethylolpropane, 1,2,6-hexanetriol, butanediol, sucrose, glucose, sorbitol, pentaerythritol, mannitol, dulcitol, triethanolamine, N-methyl-dimethanol-amine, tartaric acid, malic acid and ricinoleic acid. It is also possible to employ polythioethers, such as those produced from thioglycol, as polyhydroxylic polyethers.

Polyhydroxylic polyesters are a class of polyols which are also frequently used. They can be produced by reacting one or more polycarboxylic acids with a suitable molar excess of one or more simple polyols. Amongst the polyacids, there may be mentioned aliphatic acids such as suberic acid and sebacic acid, cycloaliphatic acids such as cyclohexane-1,4-dicarboxylic acid, and aromatic acids such as ortho-, meta- and para-phthalic acids. 1,2-Ethanediol, 1,2- and 1,3-propanediols, 1,2-, 1,3- and 1,4-butanediols, 1,6-hexanediol and 1,10-decanediol, glycerine, 1,2,6-hexanetriol, trimethylolpropane and pentaerythritol are illustrative.

It is also possible to employ α,ω-dihydroxylic polyester-amides, α,ω-dihydroxylic polyurethanes and α,ω-dihydroxylic hydrocarbons such as polybutadienes or α,ω-dihydroxylic butadiene/iso-butylene copolymers. Again, it is also possible to use optionally modified castor oil and the products of the etherification of silanols or siloxanes by polyethers or by polyhydroxylic polyesters.

The proportions by weight of the polyol to the polyisocyanate are not critical. These are chosen as a function of the envisaged application. In order to produce a polymer, the ratio is usually approximately 1, it is possible to prepare polyurethanes in which the end groups are either isocyanate groups or hydroxyl groups. When a prepolymer is prepared, the ratio of the number of isocyanate groups to the number of hydroxyl groups is normally greater than 1 and is generally between 1.05 and 3.

Any other catalyst usually employed in the urethanisation reaction can be added to the catalyst system resulting from the introduction of acetylacetone and the ferric halide. It is obvious, however, that any additional catalyst must not be too active in order that benefit of using the new system should not be lost. Tertiary amines can be employed as additional urethanisation catalysts.

The process according to the present invention can be used to prepare any type of polyurethane object. Depending on the desired type of object, it may be necessary or desirable to introduce, in addition to the main constituents, various additives well known to the specialist such as heat stabilisers and flameproofing agents, pore-forming agents, surface-active agents, ultra-violet absorbers, dyestuffs, pigments and fillers. The catalyst system used in the process of the present invention does not present any particular difficulties in the use of the various additives.

The process is particularly valuable for the manufacture of objects such as polyurethane foams, cushions, moulded objects, pieces of furniture, imitation wood panels and soles for footwear.

In the following Example which further illustrates the present invention the preparation of polyurethane foams where the control of the foaming reaction is carried out in a Fluidyne apparatus, model 121 is described. This apparatus consists essentially of a cylinder with a vertical axis inside which the foam forms and wherein the pressure developed by the foam on the lower wall of the cylinder is measured continuously. The "initial time" is defined as the instant when the reagents are mixed. The duration of the initiation period, the period of time to reach the gel point and the period of time to reach the maximum pressure are then determined. The period of initiation is complete when the pressure begins to rise. During this period, the urethanisation reation has not taken place to any great extent and the reaction mixture can be homogenised easily by stirring. The pressure then continues to rise slowly until the instant when it increases rapidly. This instant, when the system begins to crosslink, is called the "gel point".

EXAMPLE

A polyol-based mixture, comprising the following constituents, is homogenised:

119 g of a polyether, which is produced by adding propylene oxide to methylglucoside, the hydroxyl number of which is 420, 21 g of a phosphorus-containing polyether, produced by adding propylene oxide to phosphorus pentoxide (hydroxyl number: 240), 1 ml of a solution of acetylacetone in acetone (containing 7.2 g of acetylacetone in 100 ml of solution), 1.4 g of a surface-active agent consisting of a low viscosity silicone/glycol copolymer, 42 g of trichlorofluoromethane and 0.35 g of triethylamine.

Separately, a polyisocyanate-based mixture is prepared by adding 1 ml of a solution of ferric chloride in acetone (containing 3.9 g of ferric chloride in 100 ml of solution) to 134.4 g of polyisocyanate produced by phosgenation of an aniline/formaldehyde condensation product, the majority of which consists of 4,4'-diisocyanato-diphenylmethane (overall content by weight of NCO groups per 100 g of polyisocyanate: 31%).

The polyol-based and polyisocyanate-based compositions are then mixed rapidly and the whole is introduced into the Fluidyne apparatus. The periods of initiation and those necessary to reach the gel point and the maximum pressure are then measured.

By way of comparison, various experiments are carried out in which acetylacetone and/or ferric chloride are not present. The foam formation reaction was also investigated in the presence of preformed ferric acetylacetonate, used as the catalyst. The various time intervals and pressures observed are given in the following Table.

| | | Catalyst system (other than triethylamine) | | | |
|---|---|---|---|---|---|
| | | $FeCl_3$ alone | No $FeCl_3$, no acetylacetone | Ferric acetylacetonate | Acetylacetone and $FeCl_3$ according to the invention |
| Period of initiation | | 1 min. 49 secs | 3 mins. | 1 min. 8 secs | 2 mins. 51 secs. |
| Period of time to reach the gel point | | 4 mins. 48 secs. | 9 mins. 2 secs. | 1 min. 36 secs. | 3 mins. 53 secs. |

Continued

| | Catalyst system (other than triethylamine) | | | |
|---|---|---|---|---|
| | FeCl₃ alone | No FeCl₃, no acetylacetone | Ferric acetylacetonate | Acetylacetone and FeCl₃ according to the invention |
| Period of time to reach the maximum pressure | 8 mins. 1 sec. | 14 mins. 12 secs. | 2 mins. 26 secs. | 5 mins. 21 secs. |
| Maximum value of the pressure (absolute pressure) | 1.056 kg/cm² | 1.035 kg/cm² | 1.175 kg/cm² | 1.175 kg/cm² |

It can be seen that by using the combination of ferric halide and acetylacetone it is possible simultaneously to achieve a long period of initiation (valuable for ensuring satisfactory homogenisation) and a shorter duration to reach the maximum pressure, and consequently an increased rate of production.

We claim:

1. Process for preparing a polyurethane by reacting a polyol and a polyisocyanate in a reaction zone, which comprises introducing into the reaction zone, simultaneously but separately from one another, the polyol mixed with a catalytic amount of acetylacetone and the polyisocyanate to which has been added a catalytic amount of a ferric halide, at least one mol of acetylacetone being used per gram atom of iron in the ferric halide.

2. Process according to claim 1 in which the ferric halide is introduced as a solution in acetone.

3. Process according to claim 1 in which the ferric halide is introduced in an amount corresponding to from 0.001 to 1% by weight of iron based on the weight of the polyisocyanate and the acetylacetone is introduced in an amount from 0.005 to 5% by weight based on the weight of the polyisocyanate.

4. Process according to claim 3 in which the ferric halide is introduced in an amount corresponding to form 0.005 to 0.1% by weight of iron based on the weight of the polyisocyanate.

5. Process according to claim 1 in which the ferric halide is ferric chloride.

* * * * *